United States Patent [19]

Katsuda et al.

[11] Patent Number: 5,413,613
[45] Date of Patent: May 9, 1995

[54] COMPOSITIONS CONTAINING BENZODIFURANONE COMPOUNDS AND METHODS FOR COLORING HYDROPHOBIC MATERIALS USING THE SAME

[75] Inventors: Nobuyuki Katsuda, Ibaraki; Shinichi Yabushita, Mishima; Shuhei Hashizume, Osaka, all of Japan

[73] Assignee: Sumitomo Chemical Co., Ltd., Osaka, Japan

[21] Appl. No.: 150,882

[22] Filed: Nov. 12, 1993

[30] Foreign Application Priority Data

Nov. 12, 1992 [JP] Japan .................................. 4-302165
Jan. 22, 1993 [JP] Japan .................................. 5-009084

[51] Int. Cl.⁶ ........................ D06P 1/16; C09B 67/22
[52] U.S. Cl. ............................................. 8/471; 8/576; 8/578; 8/636; 8/638; 549/299
[58] Field of Search ............... 8/471, 576, 578, 636, 8/638, 922; 549/299

[56] References Cited

U.S. PATENT DOCUMENTS

| 4,115,404 | 9/1978 | Greenhalgh et al. | 8/636 |
| 4,122,087 | 10/1978 | Greenhaigh et al. | 260/325 R |
| 4,872,882 | 10/1989 | Hähnke et al. | 8/638 |
| 4,916,240 | 4/1990 | Kenyon | 8/636 |
| 5,077,416 | 12/1991 | Veda et al. | 549/299 |
| 5,196,392 | 3/1993 | Bradbury et al. | 503/227 |
| 5,220,040 | 6/1993 | Mather et al. | 549/299 |
| 5,223,616 | 6/1993 | Yamamoto et al. | 549/299 |
| 5,286,881 | 2/1994 | Sekihachi et al. | 549/299 |

FOREIGN PATENT DOCUMENTS

| 0397170 | 11/1990 | European Pat. Off. |
| 0469723 | 2/1992 | European Pat. Off. |
| 0484962 | 5/1992 | European Pat. Off. |
| 0492893 | 7/1992 | European Pat. Off. |
| 0494537 | 7/1992 | European Pat. Off. |

*Primary Examiner*—Paul Lieberman
*Assistant Examiner*—Caroline L. Dusheck
*Attorney, Agent, or Firm*—Cushman Darby & Cushman

[57] ABSTRACT

A composition for dyeing hydrophobic materials, such as polyester fiber materials, with a clear and sharp color fastness contains at least one benzodifuranone compound represented by a formulae (I) and at least one benzodifuranone compound represented by a formula (II), wherein the weight ratio of the at least one benzodifuranone compound represented by formula (I) to the at least one benzodifuranone compound represented by formula (II) is 90:10 to 10:90.

9 Claims, No Drawings

COMPOSITIONS CONTAINING BENZODIFURANONE COMPOUNDS AND METHODS FOR COLORING HYDROPHOBIC MATERIALS USING THE SAME

The present invention relates to a composition containing benzodifuranone compounds, and to a method for coloring hydrophobic materials, particularly polyester materials, using the same.

With a consumers' trend toward higher grade clothings, disperse dyes for dyeing or printing hydrophobic fiber materials with much excellent dyeability and fastness have been increasingly desired. Under such circumstances, hydrophobic fiber materials dyed with disperse dyes have come to be subjected to various after-finishing treatments, such as softening, antistatic and feel-improving finishings, and the like, to give the added values. These after-finishings are, however, carried out at relatively high temperatures, so that some problems are encountered, for example, in their dye bleeding, as well as the deterioration of wet fastness, particularly, washing fastness.

So far, many compounds, including azo compounds, have been proposed for the purpose of developing a red disperse dye excellent in washing fastness on hydrophobic fiber materials. Most of them are not yet satisfactory because of the difficulties in that the washing fastness after the after-finishing is remarkably lowered.

Various benzodifuranone compounds for dyeing or printing hydrophobic fibers have been disclosed, for example, in Unexamined Japanese Patent Application [KOKAI] Nos. 152567/1985, 109526/1977, 1222869/1981, 14876/1991 and 72571/1991. These compounds are also insufficient and further improvements are desired in their dye characteristics, dyeability and fastness.

To solve these problems, the present inventors have conducted extensive studies, and resultingly accomplished the present invention.

An object of the present invention is to provide a composition Comprising at least one member selected from the compound group represented by the following formula (I):

(I)

wherein $R_1$ represents a methylene, or straight chain or branched $C_{2-6}$ alkylene group, the latter being optionally substituted with a hydroxy, $C_{1-4}$ alkoxy or $C_{1-4}$ alkylcarbonyloxy group; and Q represents 5- or 6-membered saturated or unsaturated heterocyclic ring residue, and a least one member selected from the compound group represented by the following formula (II):

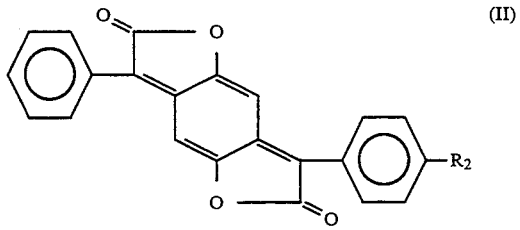

(II)

wherein $R_2$ represents a hydrogen or halogen atom, a hydroxy group, or an optionally substituted $C_{1-4}$ alkyl, $C_{1-4}$ alkoxy, $C_{1-4}$ alkoxy $C_{1-4}$ alkoxy, $C_{1-4}$ alkylcarbonyloxy, $C_{1-4}$ alkoxycarbonyl $C_{1-4}$ alkoxy, phenyl $C_{1-4}$ alkoxy, $C_{1-4}$ alkoxy $C_{1-4}$ alkoxycarbonyl $C_{1-4}$ alkoxy, or benzoyloxy group, the weight ratio of at least one member selected from the compound group represented by the formula (I) and at least one member selected from the compound group represented by the formula (II) being 90:10 to 10:90.

Another object of the invention is to provide a method for dyeing hydrophobic materials comprising using said composition containing dibenzodifuranones.

Other objects will be obvious from the following description.

The compounds represented by the above formula (I) may be selected from the group of known compounds as disclosed, for example, in Unexamined Japanese Patent Application [KOKAI] No. 72571/1991.

Saturated heterocyclic ring residues represented by Q in the formula (I) include tetrahydrofuryl, tetrahydrothienyl, tetrahydropyranyl, pyrrolidyl, piperidyl, piperazyl, morpholyl and the like. Unsaturated heterocyclic ring residues represented by Q include furyl, thienyl, pirolyl, pyridyl, pyranyl, thiazolyl, s-triazinyl and the like. These heterocyclic ring residues may be substituted with a halogen atom or a hydroxy, $C_{1-4}$ alkyl, $C_{1-4}$ alkoxy, $C_{1-4}$ alkylcarbonyl, $C_{1-4}$ alkoxycarbonyl, cyano, amino, or keto group. Among these residues, tetrahydrofuryl and tetrahydropyranyl groups optionally substituted with a $C_{1-4}$ alkyl group, as well as morpholyl group, are preferably used. Specific examples of the compounds of formula (I) suitably employed in the invention are shown in the following Table 1.

TABLE 1

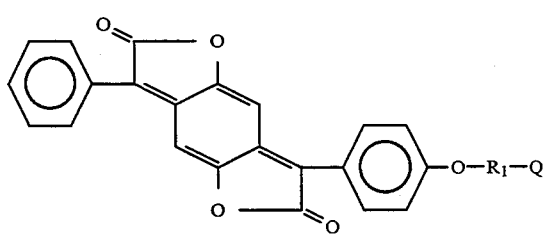

| Compound No. | $R_1$ | Q |
|---|---|---|
| (a)-1 | $CH_2$ | (tetrahydrofuryl) |
| (a)-2 | $CH_2CHCH_2$<br>\|<br>OH | (tetrahydropyranyl) |

TABLE 1-continued

[Structure: benzodifuranone core with phenyl-O-R₁-Q substituent]

| Compound No. | R₁ | Q |
|---|---|---|
| (a)-3 | CH₂CHCH₂<br>\|<br>OCH₃ | [tetrahydrofuran-2-yl] |
| (a)-4 | C₃H₆ | [tetrahydrofuran-2-yl] |
| (a)-5 | CH₂ | [5-methyl-tetrahydrofuran-2-yl] |
| (a)-6 | C₃H₆CHCH₂<br>\|<br>OCOCH₃ | —N(morpholinyl)O |

The compounds represented by the formula (II) may be selected from the group of known compounds as disclosed, for example, in Unexamined Japanese Patent Application [KOKAI] Nos. 122869/1981 and 152567/1985. Specific examples of such compounds suitably employed in the invention are shown in the following Table 2.

TABLE 2

[Structure: benzodifuranone core with phenyl-R₂ substituent]

| Compound No. | R₂ |
|---|---|
| (b)-1 | OCH₃ |
| (b)-2 | OC₂H₅ |
| (b)-3 | OC₃H₇ |
| (b)-4 | OC₄H₉ |
| (b)-5 | OCH₂—[phenyl] |
| (b)-6 | OCH₂OCH₃ |
| (b)-7 | OC₂H₄OCH₃ |
| (b)-8 | OC₃H₈OCH₃ |
| (b)-9 | OC₄H₈COCH₃<br>         ‖<br>         O |

TABLE 2-continued

| Compound No. | R₂ |
|---|---|
| (b)-10 | OCCH₃<br>‖<br>O |
| (b)-11 | OCC₂H₅<br>‖<br>O |
| (b)-12 | OCH₂COC₂H₄OC₂H₅<br>      ‖<br>      O |
| (b)-13 | H |
| (b)-14 | OH |
| (b)-15 | OC—[phenyl]<br>‖<br>O |

Weight ratio to blend at least one of the compounds in the formula (I) and at least one of the compounds in the formula (II) is 90:10 to 10:90, preferably 80:20 to 20:80.

Composition of the present invention may be prepared by blending at least one compound of the formula (I) and at least one compound of the formula (II) in a definite amount ratio depending on the desired usages, according to a well-known process. For the purpose of color controlling or others, the composition may further contain a dispersing agent, weighting agent, pH controlling agent, dispersion level dyeing agent, dyeing auxiliary, solvent, resin binder, and the like, other than the compounds of the formula (I) and formula (II).

The present compositions containing benzodifuranone compounds are useful as disperse dyes and sublimation transfer type heat-sensitive recording colors for coloring hydrophobic materials, such as polyester, triacetate, diacetate, polyamide and polycarbonate materials. Particularly, the compositions of the present invention are useful as red disperse dyes for dyeing or printing hydrophobic fiber materials.

When the present composition is used as a disperse dye, it may be in the form of a liquid product which is obtained by mixing wet cakes of the compound of tile formula (I) and of the compound of the formula (II) from the respective manufacturing processes with a single or mixed dispersing agents such as naphthalenesulfonate-formalin condensate and ligninsulfonic acid, and finely dispersing the mixture, for example, by a sand mill, or, alternatively, in the form of a powder product obtained by drying the liquid product.

For dyeing hydrophobic fiber materials, a composition of the present invention is dispersed in an aqueous medium to make a dyeing bath, and a hydrophobic fiber material is dipped in the dye bath, if required, after addition of a pH controlling agent, a dispersion level dyeing agent, etc. In case of polyester fiber materials, the dyeing is conducted under a pressurized condition at a temperature of not lower than 100° C., preferably 105°–140° C., for 30–60 minutes. The time period may be shortened or extended depending on the dyeing affinity.

Alternatively, the dyeing may be carried out in the presence of a carrier, such as o-phenylphenol and methylnaphthalene, at a relatively high temperature, for example, under a water-boiling condition. Furthermore, such a dyeing process in which a dye dispersion is padded onto a cloth may be conducted, followed by a steaming at a temperature of 100° C. or higher, or a dry-heating treatment.

For printing, a dye dispersion may be kneaded with a suitable paste, and the resulting color paste is printed on a fiber material and then subjected to a steaming or dry-heating treatment. Alternatively, the printing may be effected by an ink-jet process.

The hydrophobic fiber materials include polyester fiber, triacetate fiber, diacetate fiber, and polyamide fiber materials. As for mixed spun or combinedly woven textiles, those from a few kinds of such fiber materials, or those from such a fiber material with a natural fiber material, such as cellulose, wool and silk, may be mentioned.

The compositions of the present invention exhibit excellent dyeing characteristics, dyeability and fastness, when used as disperse dyes for dyeing or printing hydrophobic fiber materials. Specifically, the present compositions give excellent tarring and build-up due to the synergistic effects of the plural benzodifuranone compounds, while reserving the characteristics in tint and fastness provided by the compound of the formula (I). Besides, the present compositions enable one to employ a dyeing process within a shorter time period, and further with a smaller amount of a dispersion level dyeing agent, thus the amount of the dyes used being decreased. Accordingly, various dyed products with a high quality are provided economically and with high productivity, by the compositions of the present invention.

The present invention will more fully be explained in reference to the following examples, which are, however, only illustrative and never construed to be limitative. In these examples, "part" means "part by weight" and "%" represents "% by weight".

EXAMPLE 1

A mixture of 0.7 part of the compound (a)-1 in Table 1, 0.3 part of the compound (b)-1 in Table 2, and 3.0 parts of sodium naphthalenesulfonate-formalin condensate was finely dispersed in 6.0 parts of water to obtain an aqueous composition containing benzodifuranone compounds. The composition was diluted with water to make 1,000 parts of a dispersion. Using the dispersion, a polyester fiber textile was dyed according to the following conditions. The dyeing was effected with a favorable tinctorial rate, and the dyed product had an even color without blotches and exhibited good tarring and color yield.

For the comparison, each 1,000 parts of a dispersion prepared by finely dispersing a mixture of 1.0 part of the compound (a)-1, (b)-3 or (b)-12 and 3.0 parts of sodium naphthalenesulfonate-formalin condensate was used for the dyeing under the same conditions as above. The results are shown as Comparative Examples 1 through 3 in Table 3.

[Dyeing conditions and tests for tinctorial rates]

A 10.0 part portion of the above dye dispersion and 3.0 parts of SUMIPON TF (a dyeing auxiliary, manufactured by Sumitomo Chemical Co. Ltd.) were dispersed evenly in water, and then 1.2 parts of acetic acid and 4.8 parts of sodium acetate were added thereto, to make a dyeing bath in total 3,000 part amount in a pot. To each of 6 dyeing baths thus prepared was dipped 100 parts of a Tetron "tropical" cloth (a polyester fiber textile, manufactured by Toray Industries, Inc.), and the dyeing was effected by raising the temperature from 60° C. to 130° C. in 1° C./minute rate and then holding the temperature at 130° C. for 60 minutes. During the temperature rise, each pot was sequentially removed from a dyeing machine when the temperature of the bath reached 90° C., 100° C., 110° C., 120° C., or 130° C., respectively and cooled down below 90° C. The last pot was kept at 130° C. for 60 minutes to complete the dyeing. Each dyed cloth taken out of the bath was washed with water, subjected to a reduction-rinsing, washed again with water, and dried. Thus, dyed products in the respective temperature levels and from the final dyeing were obtained. The concentrations of the dyed products were estimated according to SICO-MUC-20 (a color estimation system, made by Sumika Chemical Analysis Service, Ltd.). Tinctorial rates at each temperature level were calculated according to the following equation:

Tinctorial rate (%) = Concentration of dyed product at a temperature level/Concentration of final dyed product × 100

Tinctorial rate curves were obtained by plotting the data on a graph having tinctorial rates as the ordinate, and temperatures as the abscissas.

From the curves obtained, the dyeing compositions are classified to the following three stages.

Fast (F in Table 3):
The temperature at which tinctorial rate is 50% is not higher than 100° C.

Medium (M in Table 3):
The temperature at which tinctorial rate is 50% is 100°–120° C.

Slow (S in Table 3):
The temperature at which tinctorial rate is 50% is not lower than 120° C.

[Tarring tests]

A 10.0 parts of the above dye dispersion was dispersed evenly in water, and then 0.6 parts of acetic acid and 2.4 parts of sodium acetate were added thereto, to make a dyeing bath in total 1,500 part amount.

A Tetron "jersey" cloth (a polyester knitted fabric, made by Teijin Limited) was wound on the inner cylinder of cloth-dyeing holder of Color Pet (a test-dyeing device made by NIHON SENSHOKU KIKAI KABUSHIKI KAISHA) so tightly as not to form any gap. Upper and lower ends of the holder were fixed by elastic bands to avoid looseness of the cloth. After setting the outer cylinder, the holder was placed in a dyeing pot containing the dyeing bath prepared as above. Pot temperature was rapidly raised from 90° C. to 115° C., kept at 115°–116° C. for 20 minutes, and then lowered rapidly down to 90° C. The dyed product was taken out immediately, lightly washed with water, spreaded and air-dried. Thereafter, the amount of any dye aggregate adhered onto the cloth fibers at the portions contacting the liquid-flowing hole of the inner cylinder of the dyeing holder was determined with the eye.

The determination was according to the following criteria:
⊙ No adhered aggregate observed.
  Only slight amount of adhered aggregates observed.
Δ Some amount of adhered aggregates observed.
X Much amount of adhered aggregates observed.
XX Significantly much amount of adhered aggregates observed.

[Color yield]

Dyeing was conducted in similar way as in the above tinctorial rate testing, and the concentration of the final dyed product was estimated according to the JIS L-0808 method. Color yield in contrast to the standard dyed product was calculated according to the following equation.

Color yield (%) = Concentration of a tested dyed product/Concentration of standard dyed product × 100 wherein the standard dyed product means that dyed with the (a)-1 dye.

Estimation was according to the following criteria:
⊙ Superior to the standard dyed product.
  Equal to the standard dyed product.
X Inferior to the standard dyed product.

EXAMPLES 2 THROUGH 11

In similar way as in Example 1, compositions were made using combinations of the compounds (a)-1 and (a)-2 and compounds (b)-1-6 and 12-15, as shown in Table 3, and dyeings were conducted with the compositions. The results are shown in Table 3.

Also, to verify the effects of the present compositions, the performances of C. I. Disperse Yellow 64 and C.I. Disperse Blue 56 which are yellow and blue disperse dyes among the three primary colors commonly used in the market are jointly shown in Table 3.

As obvious from the results shown in Table 3, the present compositions are satisfactory in tarring, tinctorial rate and color yield.

TABLE 3

| | Dye | Amount used | Tinctorial rate | Tarring | Color yield |
|---|---|---|---|---|---|
| Example | | | | | |
| 1 | (a)-1 | 0.7 | M | ⊙ | ○ |
|   | (b)-1 | 0.3 | | | |
| 2 | (a)-1 | 0.9 | M | ⊙ | ○ |
|   | (b)-2 | 0.1 | | | |
| 3 | (a)-1 | 0.5 | M | ⊙ | ○ |
|   | (b)-3 | 0.5 | | | |
| 4 | (a)-1 | 0.4 | M | ⊙ | ○ |
|   | (b)-4 | 0.6 | | | |
| 5 | (a)-1 | 0.2 | M | ⊙ | ○ |
|   | (b)-6 | 0.8 | | | |
| 6 | (a)-2 | 0.8 | M | ⊙ | ○ |
|   | (b)-6 | 0.2 | | | |
| 7 | (a)-1 | 0.5 | M | ⊙ | ○ |
|   | (b)-12 | 0.5 | | | |
| 8 | (a)-1 | 0.8 | | | |
|   | (b)-1 | 0.1 | F | ⊙ | ⊙ |
|   | (b)-2 | 0.1 | | | |
| 9 | (a)-1 | 0.6 | | | |
|   | (b)-3 | 0.2 | F | ⊙ | ⊙ |
|   | (b)-12 | 0.2 | | | |
| 10 | (a)-1 | 0.8 | | | |
|   | (b)-13 | 0.1 | F | ⊙ | ⊙ |
|   | (b)-14 | 0.1 | | | |
| 11 | (a)-1 | 0.6 | | | |
|   | (b)-13 | 0.2 | F | ⊙ | ⊙ |
|   | (b)-15 | 0.2 | | | |
| Comparative Example 1 | (a)-1 | 1.0 | S | ○ | Standard |
| Comparative Example 2 | (b)-3 | 1.0 | S | Δ | X |
| Comparative Example 3 | (b)-12 | 1.0 | S | Δ | X |
| Commonly used yellow and blue dyes | C.I. Disperse Yellow 64 | 1.0 | M | ⊙ | ○ |
| | C.I. Disperse Blue 56 | 1.0 | M | ⊙ | ○ |

What we claim is:

1. A composition comprising at least one member selected from the compound group represented by the following formula (I):

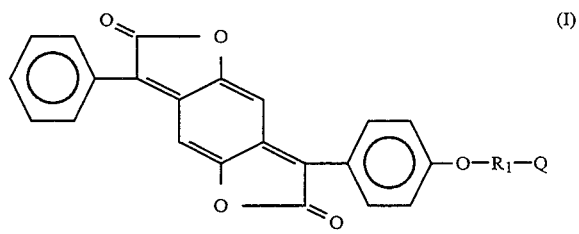

wherein $R_1$ represents a methylene, or a straight chain or branched $C_{2-6}$ alkylene group, the latter being optionally substituted with a hydroxy, $C_{1-4}$ alkoxy or $C_{1-4}$ alkylcarbonyloxy group; and Q represents a heterocyclic ring having 5 or 6 atoms which contains at least one hetero atom selected from the group consisting of O, S and N, and at least one member selected from the compound group represented by the following formula (II):

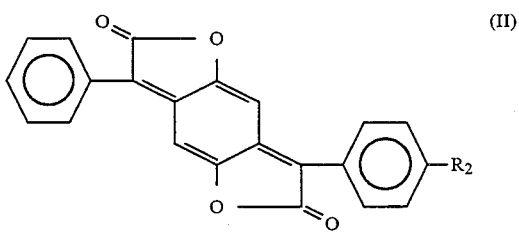

wherein $R_2$ represents a hydrogen atom, halogen atom, a hydroxy group, or a $C_{1-4}$ alkyl, $C_{1-4}$ alkoxy, $C_{1-4}$ alkoxy substituted by $C_{1-4}$ alkoxy, $C_{1-4}$ alkylcarbonyloxy, $C_{1-4}$ alkoxycarbonyl substituted by $C_{1-4}$ alkoxy, phenyl substituted by $C_{1-4}$ alkoxy, $C_{1-4}$ alkoxy substituted by $C_{1-4}$ alkoxycarbonyl substituted by $C_{1-4}$ alkoxy, or benzoyloxy group, wherein the weight ratio of the at least one member selected from the compound group represented by the formula (I) and the at least one member selected from the compound group represented by the formula (II) is 90:10 to 10:90.

2. A composition according to claim 1 in which the weight ratio of the at least one member selected from the compound group represented by the formula (I) and the at least one member selected from the compound group represented by the formula (II) is 80:20 to 20:80.

3. A method for coloring hydrophobic materials comprising applying a composition according to claim 1 to a hydrophobic material.

4. A disperse dye comprising a composition according to claim 1.

5. A heat-sensitive recording color composition suitable for sublimation transfer comprising a composition according to claim 1.

6. A composition according to claim 1, wherein $R_1$ is selected from the group consisting of methylene, $C_3H_6$,

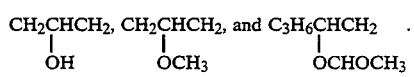

7. A composition according to claim 1, wherein Q is selected from the group consisting of

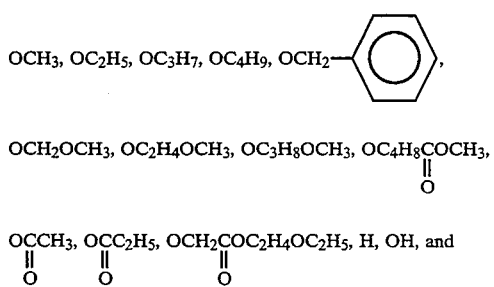

8. A composition according to claim 1, wherein $R_2$ is selected from the group consisting of $OCH_3$, $OC_2H_5$, $OC_3H_7$, $OC_4H_9$, $OCH_2$—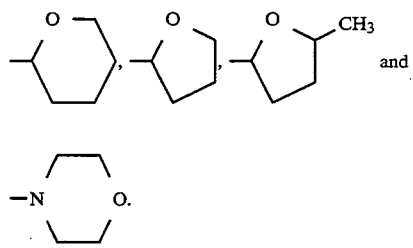, $OCH_2OCH_3$, $OC_2H_4OCH_3$, $OC_3H_8OCH_3$, $OC_4H_8\underset{\underset{O}{\|}}{C}OCH_3$, $\underset{\underset{O}{\|}}{O}CCH_3$, $\underset{\underset{O}{\|}}{O}CC_2H_5$, $\underset{\underset{O}{\|}}{O}CH_2COC_2H_4OC_2H_5$, H, OH, and

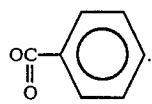

9. A composition according to claim 1, wherein $R_1$ is selected from the group consisting of methylene, $C_3H_6$,

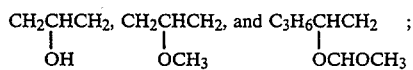

Q is selected from the group consisting of

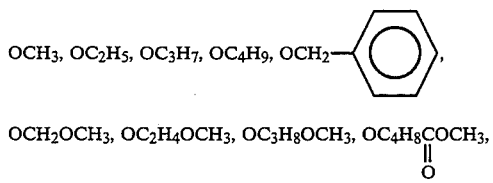

$R_2$ is selected from the group consisting of $OCH_3$, $OC_2H_5$, $OC_3H_7$, $OC_4H_9$, $OCH_2$—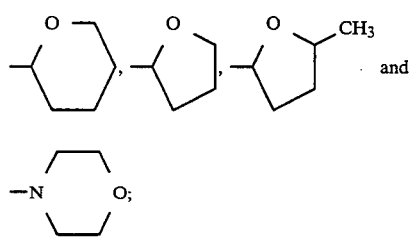, $OCH_2OCH_3$, $OC_2H_4OCH_3$, $OC_3H_8OCH_3$, $OC_4H_8\underset{\underset{O}{\|}}{C}OCH_3$ $\underset{\underset{O}{\|}}{O}CCH_3$, $\underset{\underset{O}{\|}}{O}CC_2H_5$, $\underset{\underset{O}{\|}}{O}CH_2COC_2H_4OC_2H_5$, H, OH, and

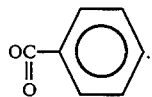

* * * * *